(12) United States Patent
Takenouchi et al.

(10) Patent No.: US 11,230,233 B2
(45) Date of Patent: Jan. 25, 2022

(54) CAMERA MOUNTING STRUCTURE

(71) Applicant: TOYOTA JIDOSHA KABUSHIKI KAISHA, Aichi-ken (JP)

(72) Inventors: Masato Takenouchi, Toyota (JP); Naoya Higashimachi, Toyota (JP); Yutaka Tokunaga, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 26 days.

(21) Appl. No.: 16/773,991

(22) Filed: Jan. 28, 2020

(65) Prior Publication Data
US 2020/0272032 A1 Aug. 27, 2020

(30) Foreign Application Priority Data
Feb. 22, 2019 (JP) .............................. JP2019-030878

(51) Int. Cl.
*G03B 17/56* (2021.01)
*B60R 11/04* (2006.01)
*B60R 11/00* (2006.01)

(52) U.S. Cl.
CPC ............ *B60R 11/04* (2013.01); *G03B 17/561* (2013.01); *B60R 2011/0026* (2013.01); *B60R 2011/0063* (2013.01)

(58) Field of Classification Search
CPC .................. G03B 17/561; B60R 11/04; B60R 2011/0026
See application file for complete search history.

(56) References Cited

U.S. PATENT DOCUMENTS

| | | | |
|---|---|---|---|
| 2017/0205625 A1* | 7/2017 | Wehninck | ................ H05B 3/20 |
| 2018/0338074 A1 | 11/2018 | Furutake | |
| 2018/0361947 A1* | 12/2018 | Matori | .................... B60R 11/04 |

FOREIGN PATENT DOCUMENTS

| | | | | |
|---|---|---|---|---|
| DE | 102014224860 A1 * | 6/2016 | ............. | B60R 11/04 |
| JP | 2018-196012 A | 12/2018 | | |
| JP | 2019-99046 A | 6/2019 | | |

OTHER PUBLICATIONS

DE 102014224860 A1 English Translation, retrieved from Espacenet (Year: 2016).*

* cited by examiner

*Primary Examiner* — Minh Q Phan
(74) *Attorney, Agent, or Firm* — Hauptman Ham, LLP (57) ABSTRACT

A camera mounting structure includes: a bracket that is attached to a vehicle upper side of an inner surface of a front windshield glass; a camera that is supported by the bracket and detects information about the surroundings of a vehicle; and an angle-of-view hood member that has a fastening portion fastened to the bracket and a catch portion caught on the bracket and is disposed on a vehicle front lower side of a lens of the camera.

11 Claims, 6 Drawing Sheets

CAMERA MOUNTING STRUCTURE

CROSS-REFERENCE TO RELATED APPLICATION

This application is based on and claims priority under 35 USC 119 from Japanese Patent Application No. 2019-030878 filed on Feb. 22, 2019, the disclosure of which is incorporated by reference herein.

BACKGROUND

Technical Field

The present disclosure relates to a camera mounting structure.

Related Art

Conventionally, a structure is known where an onboard camera disposed in close proximity to a front windshield glass of a vehicle has a body portion, a bracket, and an angle-of-view hood member and where the body portion is attached via the bracket to the front windshield glass (e.g., see Japanese Patent Application Laid-open (JP-A) No. 2018-196012).

In this kind of structure, in a case where the body portion, the bracket, and the angle-of-view hood member of the camera are separate bodies, sometimes the angle-of-view hood member is attached to the bracket. However, depending on how the angle-of-view hood member is attached to the bracket, there is the concern that the position of the angle-of-view hood member with respect to the body portion (lens) of the camera will vary when the bracket having the angle-of-view member attached to it is attached to the front windshield glass.

SUMMARY

Thus, it is an object of the present disclosure to obtain a camera mounting structure that can inhibit variation in the position of the angle-of-view hood member with respect to the lens of the camera disposed in close proximity to the front windshield glass.

A camera mounting structure pertaining to a first aspect includes: a bracket that is attached to a vehicle upper side of an inner surface of a front windshield glass; a camera that is supported by the bracket and detects information about the surroundings of a vehicle; and an angle-of-view hood member that has a fastening portion fastened to the bracket and a catch portion caught on the bracket and is disposed on a vehicle front lower side of a lens of the camera.

According to the first aspect, the angle-of-view hood member disposed on the vehicle front lower side of the lens of the camera has the fastening portion fastened to the bracket and the catch portion caught on the bracket. Consequently, compared to a configuration where the angle-of-view hood member has just the fastening portion fastened to the bracket, variation in the position of the angle-of-view hood member with respect to the lens of the camera is inhibited.

A camera mounting structure pertaining to a second aspect is the camera mounting structure pertaining to the first aspect, wherein the fastening portion is formed on a rear portion of the angle-of-view hood member, and the catch portion is formed on a front portion of the angle-of-view hood member.

According to the second aspect, the fastening portion is formed on the rear portion of the angle-of-view hood member, and the catch portion is formed on the front portion of the angle-of-view hood member. For this reason, the front portion and the rear portion of the angle-of-view hood member are secured to the bracket. Consequently, variation in the position of the angle-of-view hood member with respect to the lens of the camera is effectively inhibited.

A camera mounting structure pertaining to a third aspect is the camera mounting structure pertaining to the second aspect, wherein the catch portion is configured by plural claw portions spaced an interval apart from each other in the vehicle width direction.

According to the third aspect, the catch portion is configured by the plural claw portions spaced an interval apart from each other in the vehicle width direction. For that reason, the front portion of the angle-of-view hood member is secured to the bracket across the vehicle width direction. Consequently, variation in the position of the angle-of-view hood member with respect the lens of the camera is more effectively inhibited.

A camera mounting structure pertaining to a fourth aspect is the camera mounting structure pertaining to the third aspect, wherein the claw portions are three in number and are configured so that the bracket is sandwiched and held from above and below by a claw portion in a middle of the bracket and by claw portions at both ends of the bracket.

According to the fourth aspect, the claw portions are three in number and are configured so that the bracket is sandwiched and held from above and below by the claw portion in the middle and the claw portions on both ends. For this reason, the front portion of the angle-of-view hood member is strongly secured to the bracket. Consequently, variation in the position of the angle-of-view hood member with respect to the lens of the camera is more effectively inhibited.

A camera mounting structure pertaining to a fifth aspect is the camera mounting structure pertaining to the third aspect, wherein the claw portions project in the forward direction from a front end portion of the angle-of-view hood member, and distal end portions of the claw portions are bent at right angles downward so as to become caught from an upper front side on a front surface of a front end portion of the bracket.

A camera mounting structure pertaining to a sixth aspect is the camera mounting structure pertaining to the third aspect, wherein the number of the claw portions that are disposed depends on a breadth of an angle of view of the camera.

As described above, according to the disclosure, variation in the position of the angle-of-view hood member with respect to the lens of the camera disposed in close proximity to the front windshield glass can be inhibited.

DETAILED DESCRIPTION

An embodiment pertaining to the disclosure will be described in detail below based on the drawings. For convenience of description, arrow UP appropriately shown in the drawings indicates a vehicle upward direction, arrow FR indicates a vehicle forward direction, and arrow RH indicates a vehicle rightward direction. Consequently, when the directions of upper/lower, front/rear, and right/left are used without further specification in the following description, these will be understood to mean upper/lower in the vehicle up and down direction, front/rear in the vehicle front and rear direction, and right/left in the vehicle right and left direction (vehicle width direction).

Figure 1:
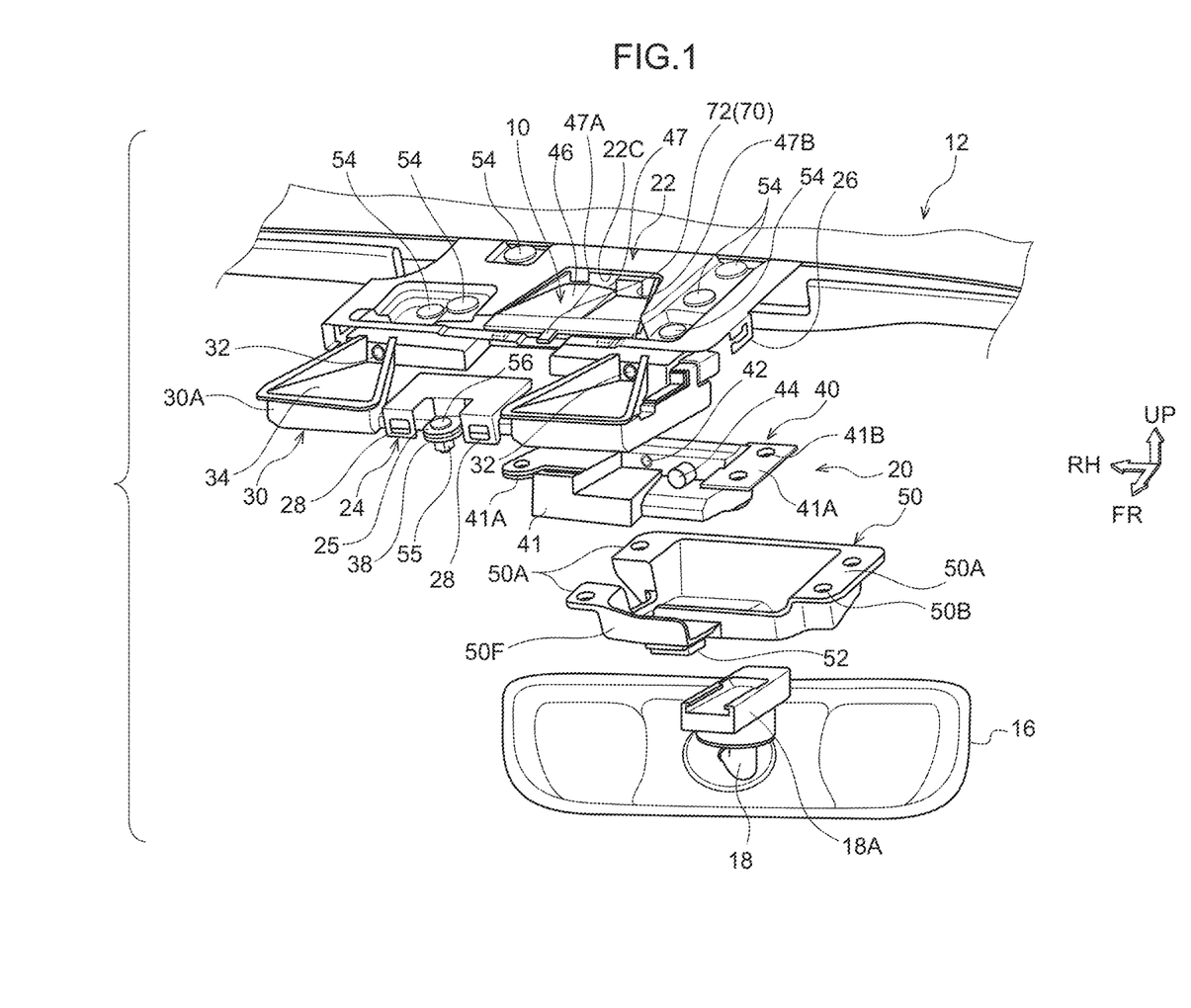
FIG. 1 is an exploded perspective view showing part of a camera unit equipped with a camera mounting structure pertaining to an embodiment.

As shown in FIG. 1, a camera unit 20 equipped with a camera mounting structure 10 pertaining to the embodiment that is mounted to a vehicle 12 is provided on an inner surface of a front windshield glass 14 (see FIG. 2) on the vehicle front upper side of an electronic inner mirror 16 serving as an example of a display device that displays at least an image of what is in back of the vehicle 12. The camera unit 20 is equipped with a stereo camera device 30 and a locator/telephoto camera device 40 that serves as an example of a camera.

Figure 2:
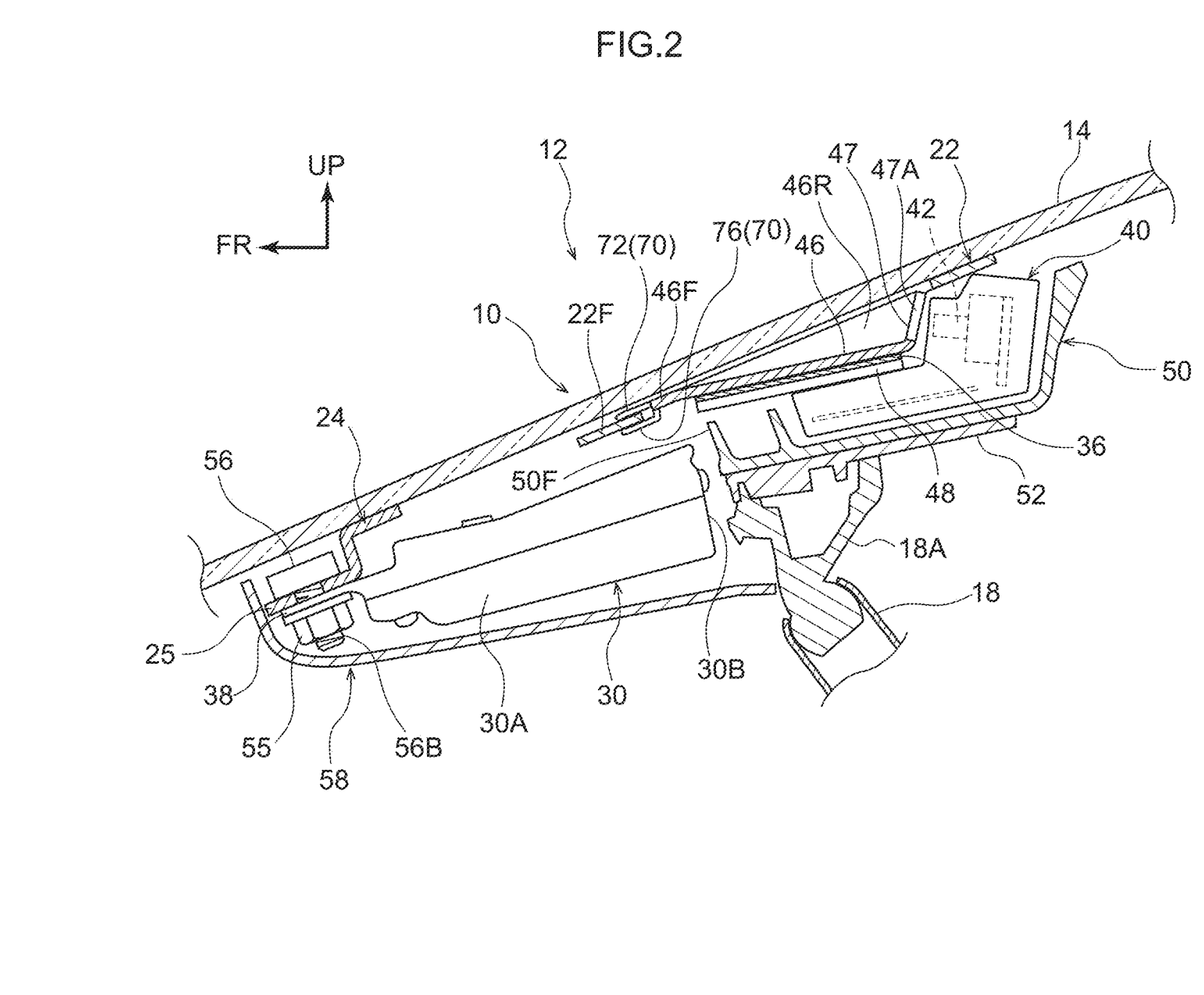
FIG. 2 is a side sectional view showing the camera mounting structure pertaining to the embodiment.
Figure 3:
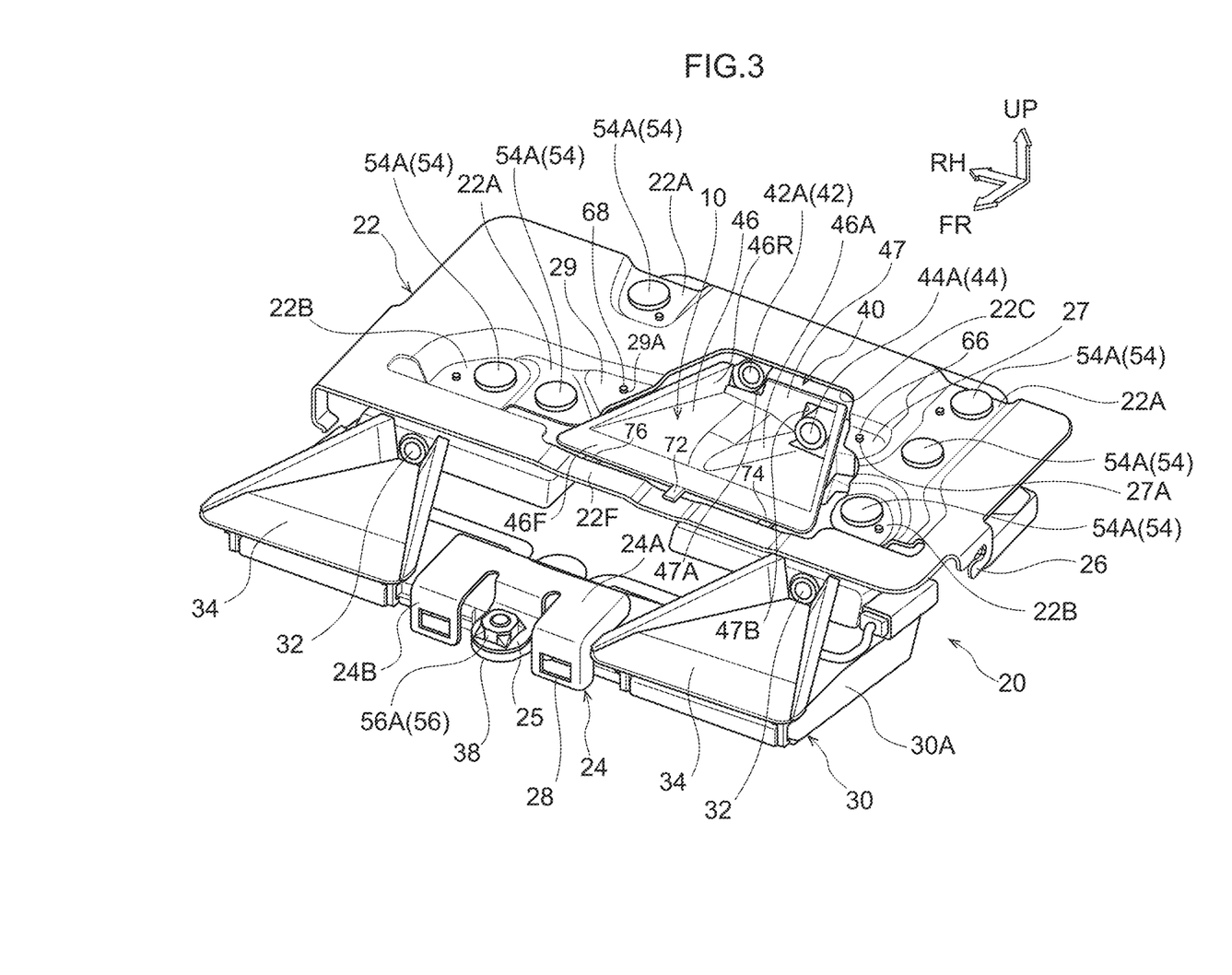
FIG. 3 is a perspective view showing, as seen from a vehicle upper side, the camera mounting structure pertaining to the embodiment.

As shown in FIG. 1 to FIG. 3, the stereo camera device 30 has a right and left pair of stereo cameras 32 that image the traveling environment in front of the vehicle 12 and detect information (positions, directions, distances, etc.) about the surroundings of the vehicle 12, and the stereo cameras 32 are provided apart from each other in the vehicle width direction in a device body 30A. The stereo camera device 30 is disposed more in the vehicle forward direction than a housing 50 that houses part of the locator/telephoto camera device 40 (see FIG. 2).

The locator/telephoto camera device 40 has a locator camera 42 and a telephoto camera 44 for driving assistance (for autonomous driving) that image the traveling environment in front of the vehicle 12 and detect information (positions, directions, distances, etc.) about the surroundings of the vehicle 12. The locator camera 42 and the telephoto camera 44, which are a right and left pair of cameras, are provided in a device body 41 in closer proximity to each other in the vehicle width direction than the right and left stereo cameras 32 because they detect different information about the surroundings than the stereo cameras 32.

The camera unit 20 is equipped with a main bracket 22 that is attached by an adhesive or the like to the vehicle width direction middle portion of the vehicle upper side of the inner surface of the front windshield glass 14. The main bracket 22 is a bracket for attaching the rear end portion of the stereo camera device 30 and the locator/telephoto camera device 40 (the housing 50) and is formed of sheet metal in a substantially rectangular shape having an open portion 22C in its substantially middle portion as seen in a plan view.

Specifically, recessed portions 22A are formed in the rear end portion of the main bracket 22 on both right and left sides thereof, and a through hole (not shown in the drawings) that is circular in shape as seen in a plan view is formed in the bottom surface of each recessed portion 22A. The left-side recessed portion 22A extends in the vehicle front and rear direction (its longitudinal direction coincides with the vehicle front and rear direction), and a through hole (not shown in the drawings) that is circular in shape as seen in a plan view is also formed in the front end portion of the left-side recessed portion 22A (the vehicle front and rear direction substantially middle portion of the main bracket 22).

A recessed portion 22A is also formed in the front portion (the portion disposed more rearward than a front end portion 22F) of the main bracket 22 on the right side thereof, and a through hole (not shown in the drawings) that is circular in shape as seen in a plan view is also formed in the bottom surface of the recessed portion 22A. Shaft portions (not shown in the drawings) of weld bolts 54 are inserted through the through holes in the recessed portions 22A, and head portions 54A of the weld bolts 54 are securely attached by welding to the bottom surfaces of the recessed portions 22A around the through holes.

Flange portions 41A (see FIG. 1) formed in the device body 41 of the locator/telephoto camera device 40 and flange portions 50A (see FIG. 1) formed in the housing 50 are jointly fastened (together fastened) to the main bracket 22 by these four weld bolts 54 and four nuts (not shown in the drawings).

Namely, through holes 41B, 50B (see FIG. 1) that are circular in shape as seen in a plan view and are for inserting the shaft portions of the weld bolts 54 therethrough are formed apart from each other in the vehicle front and rear direction in the flange portions 41A and the flange portions 50A, respectively, and the locator/telephoto camera device 40 and the housing 50 are fastened to the main bracket 22 at four places in front, back, right, and left.

A recessed portion 22B is formed on the vehicle width direction outer side in the bottom surface of the recessed portion 22A formed in the right front portion of the main bracket 22, and a through hole (not shown in the drawings) that is circular in shape as seen in a plan view is formed in the bottom surface of the recessed portion 22B. A shaft portion (not shown in the drawings) of a weld bolt 54 is inserted through the through hole, and a head portion 54A of the weld bolt 54 is securely attached by welding to the bottom surface of the recessed portion 22B around the through hole.

A recessed portion 22B is also formed on the vehicle front side in the bottom surface of the recessed portion 22A formed on the left side of the main bracket 22, and a through hole (not shown in the drawings) that is circular in shape as seen in a plan view is formed in the bottom surface of the recessed portion 22B. A shaft portion (not shown in the drawings) of a weld bolt 54 is inserted through the through hole, and a head portion 54A of the weld bolt 54 is securely attached by welding to the bottom surface of the recessed portion 22B around the through hole.

A right and left pair of flange portions (not shown in the drawings) are provided projecting in the vehicle rearward direction on both right and left sides of the rear end portion of the stereo camera device 30, and a through hole (not shown in the drawings) that is circular in shape as seen in a plan view is formed in each flange portion. The shaft portions of the weld bolts 54 provided in the recessed portions 22B are inserted through the through holes formed in the flange portions.

Namely, both right and left sides of the rear end portion of the stereo camera device 30 are fastened and secured to the main bracket 22 by these two weld bolts 54 and two nuts (not shown in the drawings). Because of this, a front wall 50F of the housing 50 is disposed in close proximity to a rear wall 30B of the stereo camera device 30 (the device body 30A) (see FIG. 2).

The camera unit 20 is equipped with an auxiliary bracket 24 that is attached by an adhesive or the like to the vehicle width direction middle portion of the inner surface of the front windshield glass 14 on the vehicle front side of the main bracket 22. The auxiliary bracket 24 is a bracket for attaching the front end portion of the stereo camera device 30 and is formed of sheet metal in a substantially rectangular shape that is smaller than the main bracket 22 as seen in a plan view.

Specifically, a tongue portion 25 is formed in the vehicle width direction middle portion of the front side of the auxiliary bracket 24 as a result of both sides thereof including the front end portion being cut out. The base portion of the tongue portion 25 is formed bent in such a way that the tongue portion 25 is disposed in a lower position (more in the vehicle downward direction) than an upper surface 24A of the auxiliary bracket 24, and a through hole (not shown in the drawings) that is circular in shape as seen in a plan view is formed in the middle of the tongue portion 25.

A shaft portion 56B of a weld bolt 56 (see FIG. 2) that is a little smaller in diameter than the weld bolts 54 is inserted through the through hole, and a head portion 56A of the weld bolt 56 is securely attached by welding to the upper surface of the tongue portion 25 around the through hole.

A flat plate-like flange portion 38 is provided projecting in the vehicle forward direction in the middle portion of the front end portion of the stereo camera device 30, and a through hole (not shown in the drawings) that is circular in shape as seen in a plan view is formed in the flange portion 38. The shaft portion 56B of the weld bolt 56 is inserted through the through hole formed in the flange portion 38.

Namely, the middle portion of the front end portion of the stereo camera device 30 is fastened and secured to the auxiliary bracket 24 by this one weld bolt 56 and one nut 55 (see FIG. 1 and FIG. 2), so the stereo camera device 30 is fastened to the auxiliary bracket 24 and the main bracket 22 at a total of three places—one place on the front side and two places on the rear side.

Catch receiving portions 26, which allow a right and left pair of rear-side catch claws (not shown in the drawings) provided on a cover 58 (see FIG. 2) that covers the stereo camera device 30 and the front-side portion of the housing 50 from the vehicle lower side to catch therein from the front side, are formed as a right and left pair on both vehicle width direction end portions of the main bracket 22.

Front end portions 24B of the auxiliary bracket 24 on both right and left sides of the tongue portion 25 are bent at right angles in the vehicle downward direction, and catch receiving holes 28, which allow a right and left pair of front-side catch claws (not shown in the drawings) provided on the cover 58 to catch therein from the front side, are formed in the front end portions 24B.

As shown in FIG. 1 and FIG. 3, angle-of-view hood portions 34, each in the shape of an isosceles trapezoid that widens in the vehicle width direction heading in the vehicle forward direction as seen in a plan view, are integrally formed in the device body 30A of the stereo camera device 30 on the vehicle front sides of the stereo cameras 32. An angle-of-view hood member (hereinafter called "the hood member") 46, substantially in the shape of an isosceles trapezoid that widens in the vehicle width direction heading in the vehicle forward direction as seen in a plan view, is attached to the main bracket 22 so as to plug the open portion 22C.

Specifically, the hood member 46 is formed of resin and has a left side wall 46L integrally provided erectly on its left-side edge portion and a right side wall 46R integrally provided erectly on its right-side edge portion. The left side wall 46L and the right side wall 46R are both formed in the shape of an obtuse triangle as seen in a side view (see FIG. 2).

A rear wall 47 that is continuous with the left side wall 46L and the right side wall 46R is integrally provided erectly on the rear-side edge portion of the hood member 46. In the rear wall 47 are formed a cutout portion 47A, which exposes a lens 42A of the locator camera 42 to the front direction, and an open portion 47B, which allows a lens 44A of the telephoto camera 44 to project in the forward direction.

Figure 4:
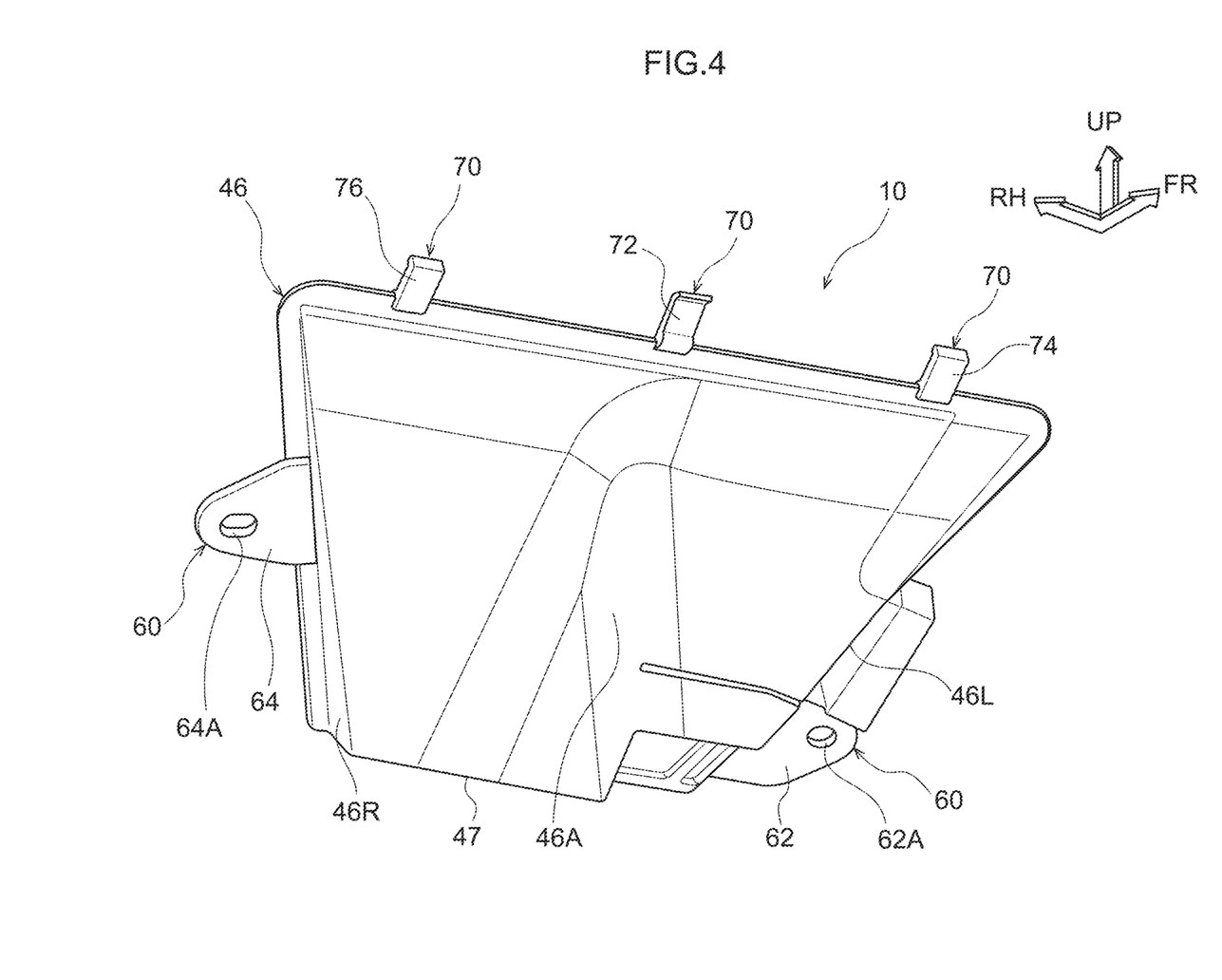
FIG. 4 is a perspective view showing, as seen from a vehicle lower side, a hood member configuring the camera mounting structure pertaining to the embodiment.

As shown in FIG. 4, fastening portions 60 fastened to the main bracket 22 are formed on the rear portion side of the hood member 46. The fastening portions 60 are configured by a flat plate-like flange portion 62, which projects outward (leftward) in the vehicle width direction from the rear portion of the upper end of the left side wall 46L of the hood member 46, and a flat plate-like flange portion 64, which projects outward (rightward) in the vehicle width direction from the substantially middle portion (a little more rearward than the front and rear direction middle portion) of the upper end of the right side wall 46R of the hood member 46. Small holes 62A, 64A that are circular in shape and a little smaller in diameter than later-described fastening pins 66, 68 are formed in the flange portions 62, 64, respectively.

As shown in FIG. 3, a fastening receiving portion 27, on whose lower surface is placed the upper surface of the left-side flange portion 62, is formed in the main bracket 22 on the vehicle width direction inner side of the left-side recessed portion 22A and on the vehicle width direction outer side of the open portion 22C. A small hole 27A that is circular in shape and has the same diameter as the small hole 62A is formed in the fastening receiving portion 27.

A fastening receiving portion 29, on whose lower surface is placed the upper surface of the right-side flange portion 64, is formed in the main bracket 22 on the vehicle width direction inner side of the right-side front recessed portion 22A and on the vehicle width direction outer side of the open portion 22C. A small hole 29A that is circular in shape and has the same diameter as the small hole 64A is formed in the fastening receiving portion 29.

Consequently, the rear portion (the fastening portions 60) of the hood member 46 is fastened to the main bracket 22 as follows. That is, as the hood member 46 is being disposed so as to plug the open portion 22C from the rear side of the main bracket 22, first, later-described catch portions 70 (claw portions 72, 74, 76) are made to catch on the front end portion 22F of the main bracket 22.

Next, the upper surface of the flange portion 62 is placed from the lower side on the lower surface of the fastening receiving portion 27, and the upper surface of the flange portion 64 is placed from the lower side on the lower surface of the fastening receiving portion 29. Because of this, the small hole 62A in the flange portion 62 and the small hole 27A in the fastening receiving portion 27 become communicated with each other, and the small hole 64A in the flange portion 64 and the small hole 29A in the fastening receiving portion 29 become communicated with each other.

Then, a solid cylinder-like fastening pin 66 serving as a fastener made of resin is press-fitted into the small hole 62A and the small hole 27A, and a solid cylinder-like fastening pin 68 serving as a fastener made of resin is press-fitted into the small hole 64A and the small hole 29A. Because of this, the fastening portions 60 (the flange portions 62, 64) of the hood member 46 are fastened to the fastening receiving portions 27, 29 of the main bracket 22, and the hood member 46 is attached to the main bracket 22.

Figure 5:
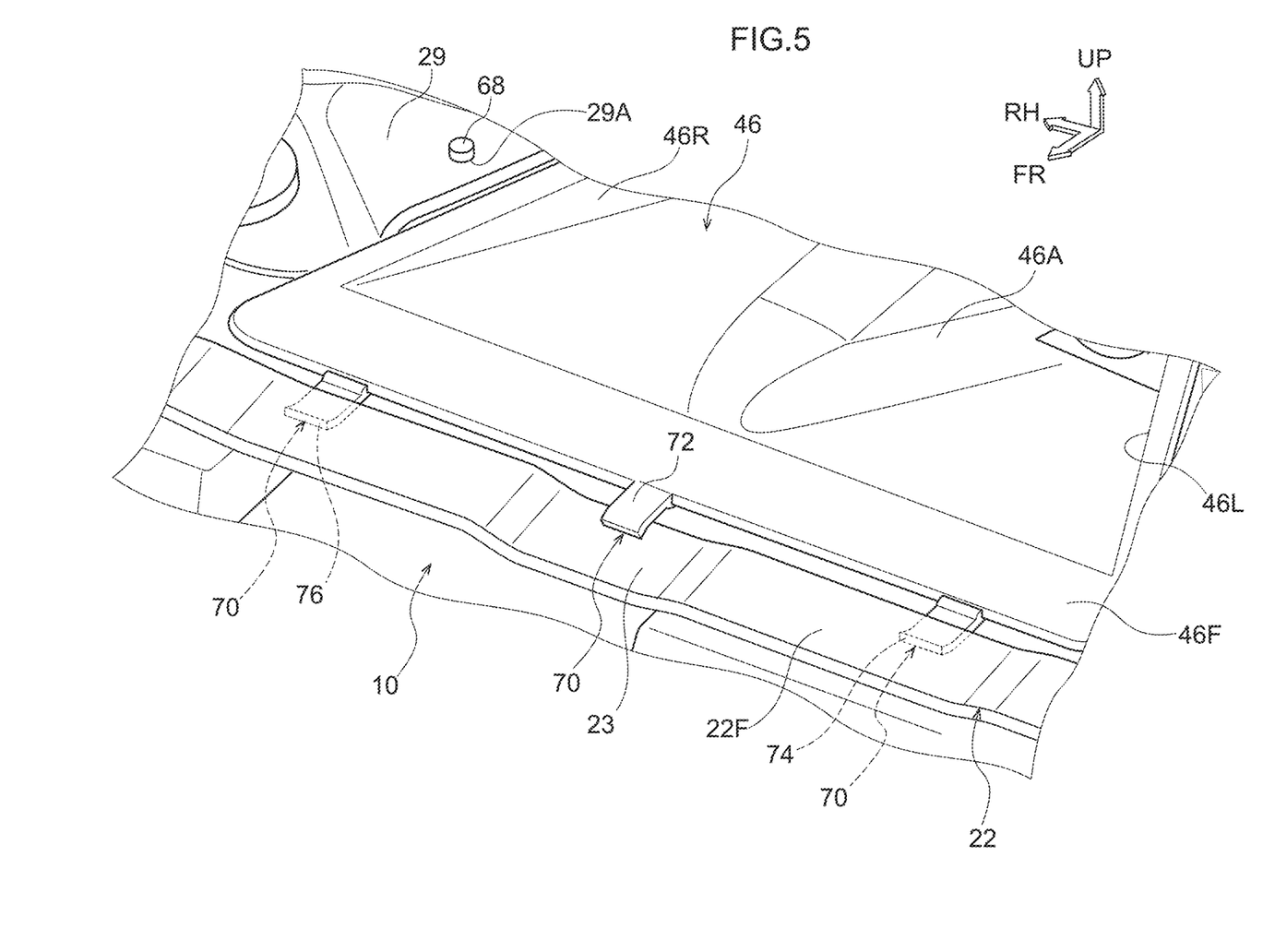
FIG. 5 is an enlarged perspective view showing claw portions of the hood member configuring the camera mounting structure pertaining to the embodiment.

As shown in FIG. 4 and FIG. 5, catch portions 70 caught on the front end portion 22F of the main bracket 22 are formed on a front end portion 46F serving as a front portion of the hood member 46. The catch portions 70 are configured by plural (e.g., three) claw portions 72, 74, 76 spaced an interval apart from each other in the vehicle width direction. The claw portion 72 is integrally formed on the front end portion 46A of the hood member 46 so as to project in the forward direction from the upper surface of the vehicle width direction middle portion of the front end portion 46.

The claw portion 74 is integrally formed on the front end portion 46F of the hood member 46 so as to project in the forward direction from the lower surface of the left end portion (one end portion in the vehicle width direction) of the front end portion 46F. The claw portion 76 is integrally formed on the front end portion 46F of the hood member 46 so as to project in the forward direction from the lower surface of the right end portion (the other end portion in the vehicle width direction) of the front end portion 46F.

The claw portion 72 and the claw portions 74, 76 are formed in the same rectangular shape as seen in a plan view, and the base portion sides (on the front end portion 46F side) of the claw portions 72, 74, 76 are formed thick for reinforcement. The distal end portion of the claw portion 72 is bent at a substantially right angle downward, and the distal end portions of the claw portions 74, 76 are bent at substantially right angles upward. Namely, the claw portion 72 and the claw portions 74, 76 are formed vertically symmetrical.

As shown in FIG. 5, the distal end portion of the claw portion 72 catches from above on the upper surface of the front end portion 22F of the main bracket 22, and the distal end portions of the claw portion 74 and the claw portion 76 catch from below on the lower surface of the front end portion 22F of the main bracket 22. That is, the front end portion 22F of the main bracket 22 is sandwiched and held from above and below by the claw portion 72 and the claw portions 74, 76 (see FIG. 2).

A recessed portion 23 that is slightly recessed downward is integrally formed in the vehicle width direction middle portion of the front end portion 22F of the main bracket 22, and the distal end portion of the claw portion 72 is caught on the upper surface of the recessed portion 23. The hood member 46 having the above configuration is disposed on the front lower side of the lens 42A of the locator camera 42 and the lens 44A of the telephoto camera 44 (see FIG. 3).

The telephoto camera 44 is disposed in a lower position than the locator camera 42. For that reason, the hood member 46 is formed in such a way that its height is different at its vehicle width direction substantially middle portion, so that the locator camera 42 side is in a higher position and the telephoto camera 44 side is in a lower position. That is, a step portion 46A (see FIG. 3 to FIG. 5) is formed in the vehicle width direction substantially middle portion of the hood member 46.

The upper surface of the front end portion 46F of the hood member 46 does not contact (is contactless) the inner surface of the front windshield glass 14 (see FIG. 2). The hood member 46 is colored black, for example, to inhibit or prevent the reflection of light that has passed through the front windshield glass 14 (reflection into the locator camera 42 and the telephoto camera 44).

As shown in FIG. 2, a heater 36 serving as a heating element is provided on, in a state in which its upper surface is in contact with (adhered to), the lower surface of the hood member 46. When the heater 36 emits heat, the hood member 46 made of resin becomes heated and the air around the hood member 46 becomes warmed. That is, defogging performance with respect to the front windshield glass 14 is ensured. A heat-insulating member 48 for ensuring that the heat of the heater 36 does not escape (does not radiate) downward is provided on the lower surface of the heater 36.

As shown in FIG. 1 and FIG. 2, a mirror bracket 52 for attaching the electronic inner mirror 16 is provided on the vehicle width direction substantially middle portion of the bottom wall of the housing 50. An upper end portion 18A of an arm member 18 of the electronic inner mirror 16 is attached to the mirror bracket 52, whereby the electronic inner mirror 16 is supported by the housing 50.

Next, the action of the camera mounting structure 10 pertaining to the embodiment having the above configuration will be described.

As shown in FIG. 3 to FIG. 5, the hood member 46 disposed on the front lower side of the lens 42A of the locator camera 42 and the lens 44A of the telephoto camera 44 has the fastening portions 60 (the flange portions 62, 64) fastened to the fastening receiving portions 27, 29 of the main bracket 22 and the catch portions 70 (the claw portions 72, 74, 76) caught on the front end portion 22F of the main bracket 22.

That is, the rear portion side of the hood member 46 is fastened to the main bracket 22 and the front portion side of the hood member 46 is caught on the main bracket 22, so that the front portion and the rear portion of the hood member 46 are secured to the main bracket 22. Consequently, compared to a configuration where, for example, the hood member 46 has just the fastening portions 60 fastened to the fastening receiving portions 27, 29 of the main bracket 22, variation in the position of the hood member 46 with respect to the lenses 42A, 44A can be inhibited or prevented.

Specifically, what is called "deflection," in which the front end portion 46F of the hood member 46 swings up and down centering on a virtual axis of rotation interconnecting the fastening pins 66, 68, can be inhibited or prevented. In particular, if the front end portion 46F of the hood member 46 deflects up and down, the front end portion 46F may obstruct the angle of view of the lenses 42A, 44A and/or hit the inner surface of the front windshield glass 14 causing abnormal sounds, but in the present embodiment this can be effectively inhibited or prevented.

The catch portions 70 of the hood member 46 are configured by the three claw portions 72, 74, 76 spaced an interval apart from each other in the vehicle width direction. The front end portion 22F (including the recessed portion 23) of the main bracket 22 is sandwiched and held from above and below by the claw portion 72 in the middle and the claw portions 74, 76 on both left and right ends.

Consequently, the number of parts can be reduced, and the front end portion 46F of the hood member 46 can be strongly secured to the front end portion 22F of the main bracket 22 across the vehicle width direction thereof. Thus, variation in position with respect to the lenses 42A, 44A—that is, the deflection mentioned above—and torsion whose axial direction coincides with the front and rear direction can be more effectively inhibited or prevented from occurring in the hood member 46.

Figure 6:
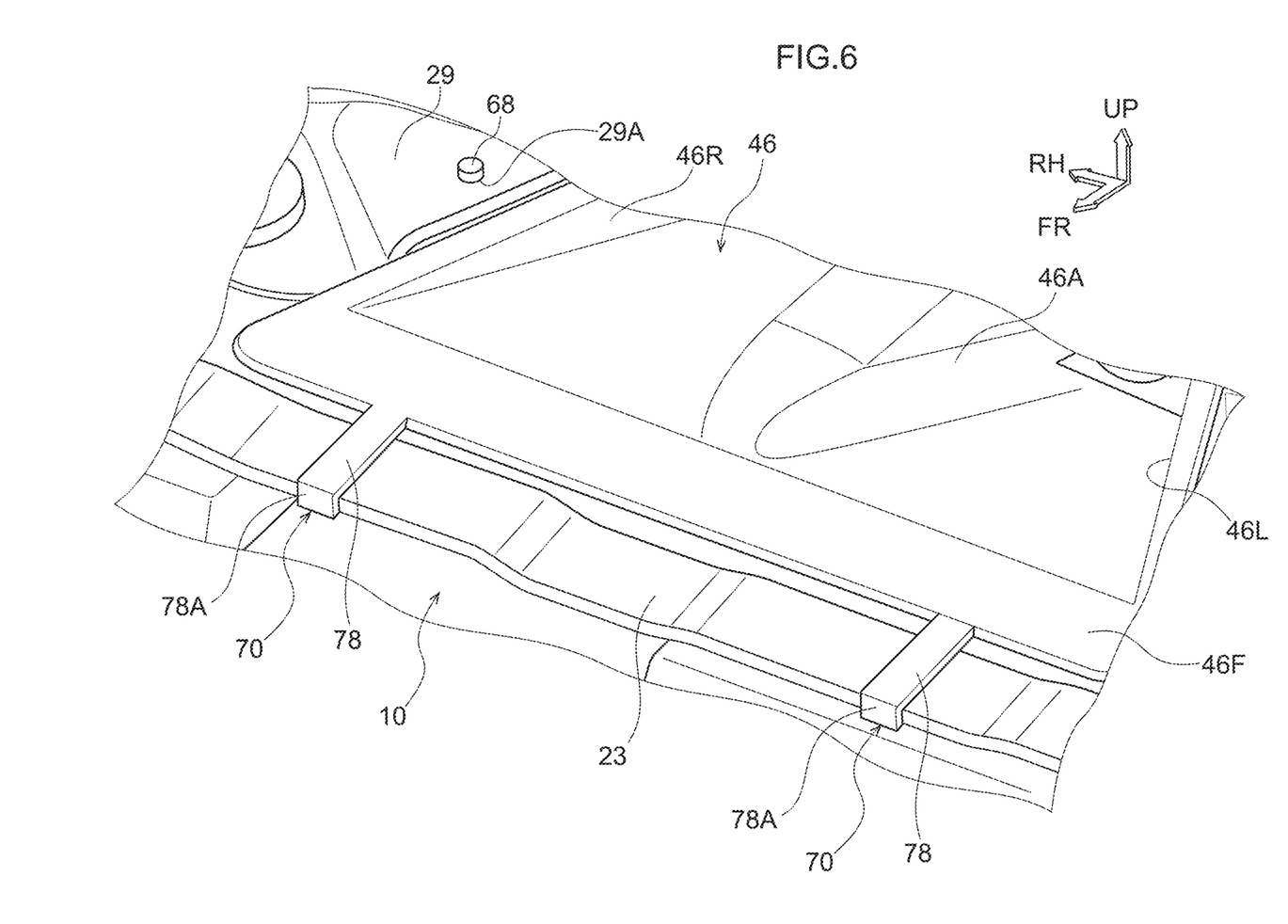
FIG. 6 is an enlarged perspective view showing an example modification of the claw portions of the hood member configuring the camera mounting structure pertaining to the embodiment.

The catch portions 70 of the hood member 46 are not limited to the claw portions 72, 74, 76 shown in FIG. 4 and FIG. 5 and, for example, may also be configured by a right and left pair of claw portions 78 shown in FIG. 6. That is, the pair of claw portions 78 project in the forward direction from predetermined positions apart from each other on the right and left on the front end portion 46F of the hood member 46, and distal end portions 78A of the claw portions 78 are bent at right angles downward so as to become caught from the upper front side on the front surface of the front end portion 22F of the main bracket 22.

Even with the pair of claw portions 78 having this configuration, like the claw portions 72, 74, 76, the front end portion 46F of the hood member 46 can be secured to the front end portion 22F of the main bracket 22 across the vehicle width direction thereof, so variation in position caused by deflection and/or torsion can be inhibited or prevented from occurring in the hood member 46.

Furthermore, the hood member 46 is attachable to and detachable from the main bracket 22 because the fastening portions 60 (the flange portions 62, 64) are fastened to the fastening receiving portions 27, 29 of the main bracket 22 and the catch portions 70 (the claw portions 72, 74, 76 or the claw portions 78) are caught on the front end portion 22F of the main bracket 22. Consequently, maintainability with respect to the hood member 46 can be ensured.

The camera mounting structure 10 pertaining to the embodiment has been described above based on the drawings, but the camera mounting structure 10 pertaining to the embodiment is not limited to what is shown in the drawings and can be appropriately changed in design in a range that does not depart from the spirit of the disclosure. For example, the positions of the locator camera 42 and the telephoto camera 44 may also be reversed in the right and left direction from the positions shown in the drawings. Needless to say, in that case, the shape of the hood member 46 is also reversed in the right and left direction.

Furthermore, the claw portions 72, 74, 76 of the hood member 46 may also be provided projecting in the opposite directions, in the up and down direction, of the directions shown in the drawings. That is, the claw portion 72 in the middle may also project from the lower surface of the front end portion 46F, and the claw portions 74, 76 on both left and right ends may also project from the upper surface of the front end portion 46F. In this case, it suffices for the recessed portion 23 in the front end portion 22F of the main bracket 22 to be formed in positions corresponding to the claw portion 74 and the claw portion 76 rather than in a position corresponding to the claw portion 72.

Furthermore, the number of claw portions serving as the catch portions 70 is not limited to the three or two shown in the drawings and, for example, may also be four or five depending on the breadth of the angle of view (the length of the front end portion 46F substantially along the vehicle width direction). Furthermore, the fastening portions 60 are not limited to being disposed in the two places shown in the drawings and, for example, may also be disposed in one place in an appropriate position not shown in the drawings.

Furthermore, the fasteners for fastening the fastening portions 60 (the flange portions 62, 64) of the hood member 46 to the fastening receiving portions 27, 29 of the main bracket 22 are not limited to the fastening pins 66, 68 shown in the drawings and, for example, may also be screws and nuts made of metal not shown in the drawings.

What is claimed is:

1. A camera mounting structure, comprising:
   a bracket that is attached to a vehicle upper side of an inner surface of a front windshield glass;
   a camera that is supported by the bracket and detects information about the surroundings of a vehicle; and
   an angle-of-view hood member that has a fastening portion fastened to the bracket and a catch portion caught on the bracket, and that is disposed on a vehicle front lower side of a lens of the camera,
   wherein the camera is attached to the bracket independently from the hood member, and
   wherein the fastening portion of the hood member and the bracket have aligned holes, and are fastened to each other by fasteners extending through the aligned holes.

2. The camera mounting structure according to claim 1, wherein
   the fastening portion is formed on a rear portion of the angle-of-view hood member, and
   the catch portion is formed on a front portion of the angle-of-view hood member.

3. The camera mounting structure according to claim 2, wherein the catch portion is configured by plural claw portions spaced an interval apart from each other in the vehicle width direction.

4. The camera mounting structure according to claim 3, wherein the claw portions project in the forward direction from a front end portion of the angle-of-view hood member, and distal end portions of the claw portions are bent at right angles downward so as to become caught from an upper front side on a front surface of a front end portion of the bracket.

5. The camera mounting structure according to claim 1, wherein
   the camera is housed in a housing, and the housing is attached to the bracket at locations rearward of the fastening portion of the hood member.

6. The camera mounting structure according to claim 1, further comprising:
   a heating element adhered to a lower surface of the hood member; and
   a heat-insulating member between the heating element and the camera.

7. The camera mounting structure according to claim 1, further comprising:
   an auxiliary bracket having:
      an upper portion attached to the front windshield glass, and
      a lower portion bent downward from the upper portion to form a tongue portion; and
   a further camera having a front end portion fastened to the tongue portion by a first bolt, the further camera extending rearward from the front end portion toward the camera, the bracket and the hood member.

8. The camera mounting structure according to claim 7, wherein
   the further camera has a rear end portion fastened to the bracket by a second bolt.

9. The camera mounting structure according to claim 7, wherein
   the camera comprises a locator camera and a telephoto camera device, and
   the further camera comprises a stereo camera device.

10. The camera mounting structure according to claim 9, wherein
    the hood portion comprises a step portion,
    the locator camera and the telephoto camera device are on opposite sides of the step portion, and
    the locator camera device is at a higher position than the telephoto camera device.

11. A camera mounting structure, comprising:
    a bracket that is attached to a vehicle upper side of an inner surface of a front windshield glass;
    a camera that is supported by the bracket and detects information about the surroundings of a vehicle; and an angle-of-view hood member that has a fastening portion fastened to the bracket and a catch portion caught on the bracket, and that is disposed on a vehicle front lower side of a lens of the camera,
wherein
the fastening portion is formed on a rear portion of the angle-of-view hood member,
the catch portion is formed on a front portion of the angle-of-view hood member,
the catch portion is configured by plural claw portions spaced an interval apart from each other in the vehicle width direction, and
the claw portions are three in number and are configured so that the bracket is sandwiched and held from above and below by a claw portion in a middle of the bracket and by claw portions at both ends of the bracket.

* * * * *